L. M. PERKINS.
SYSTEM OF CONTROL.
APPLICATION FILED MAR. 13, 1916.

1,268,052.

Patented May 28, 1918.
5 SHEETS—SHEET 1.

WITNESSES:
R.J.Cidge.
W.R.Coley

INVENTOR
Laurence M. Perkins.
BY
Wesley G. Carr
ATTORNEY

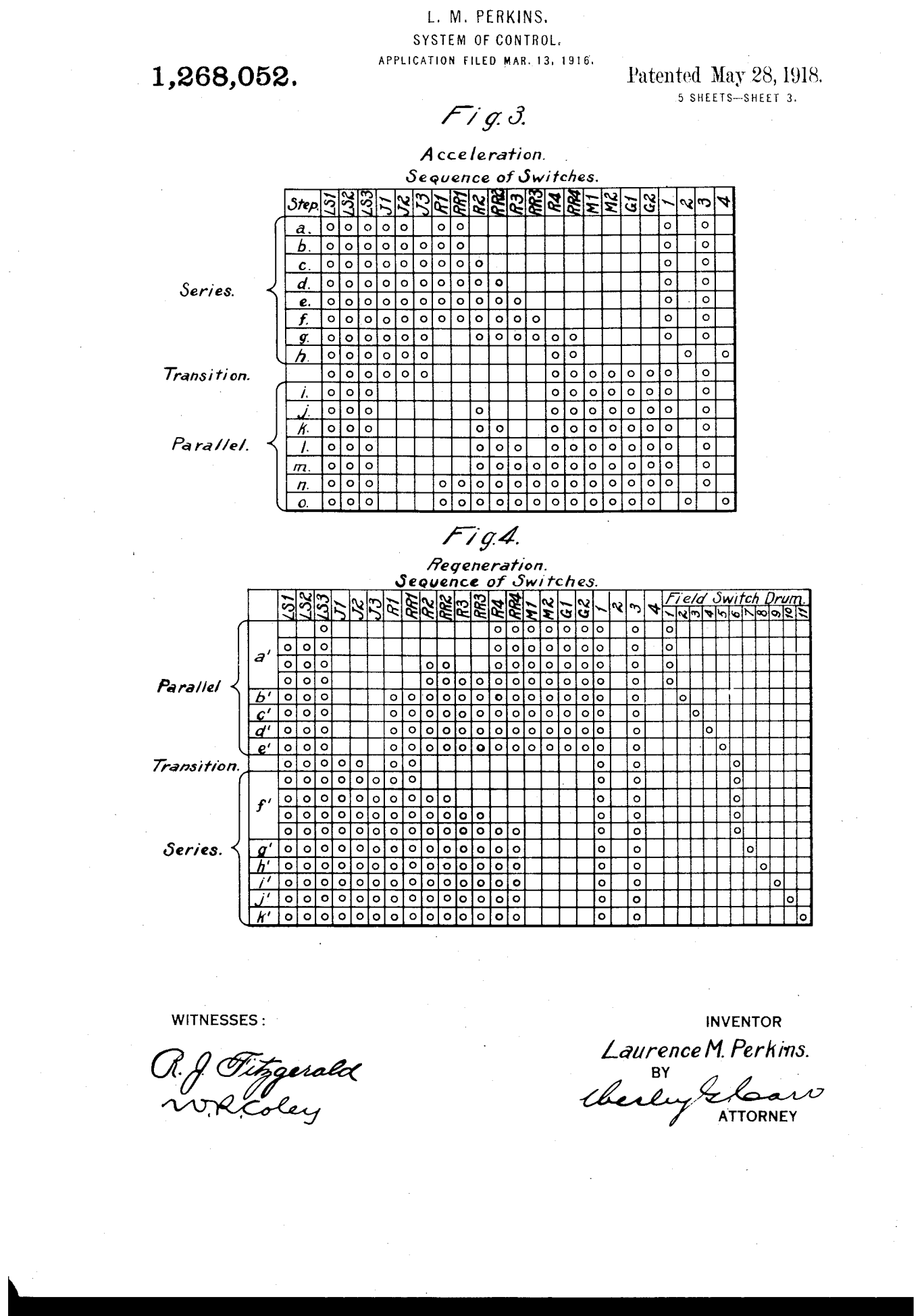

L. M. PERKINS.
SYSTEM OF CONTROL.
APPLICATION FILED MAR. 13, 1916.

1,268,052.

Patented May 28, 1918.
5 SHEETS—SHEET 3.

Fig. 3.

Acceleration.
Sequence of Switches.

L. M. PERKINS.
SYSTEM OF CONTROL.
APPLICATION FILED MAR. 13, 1916.
1,268,052.
Patented May 28, 1918.
5 SHEETS—SHEET 4.
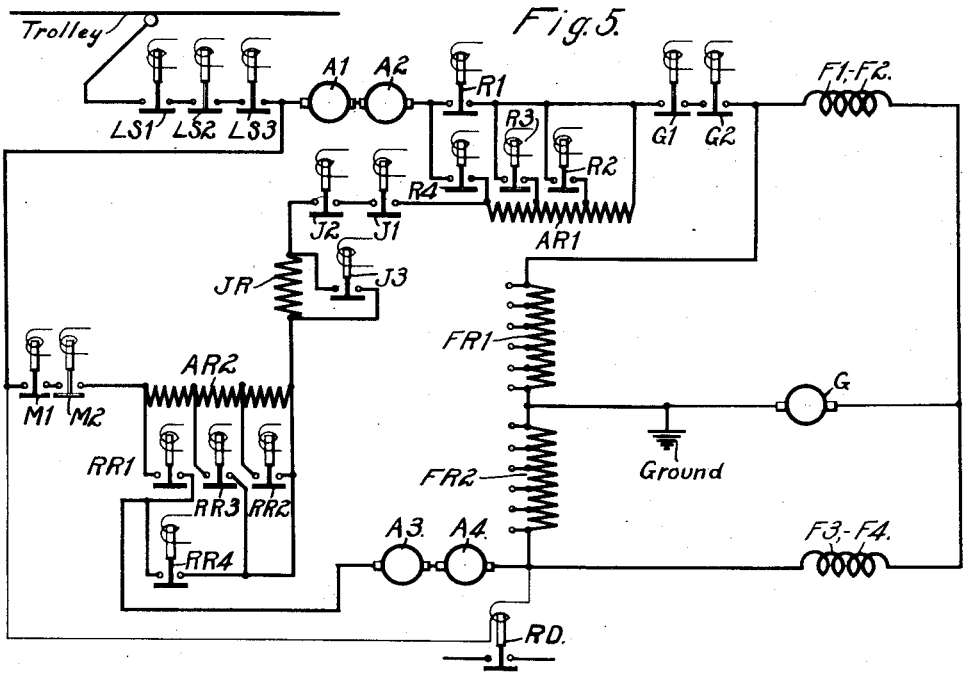
Fig. 5.
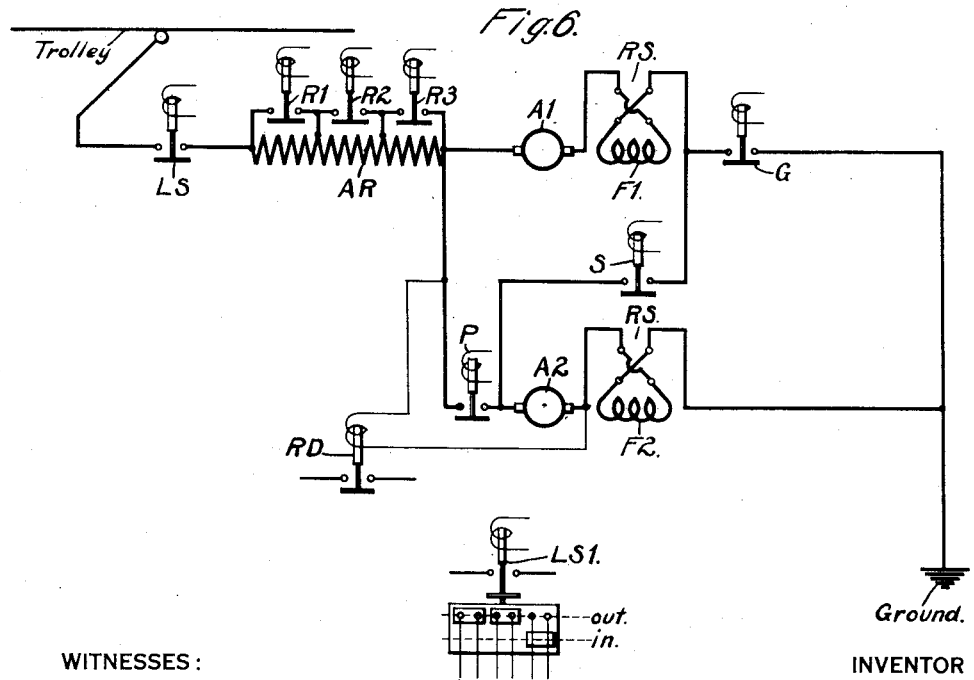
Fig. 6.
Fig. 7.
WITNESSES:
R. J. Fitzgerald.
W. R. Coley
INVENTOR
Laurence M. Perkins.
BY
ATTORNEY

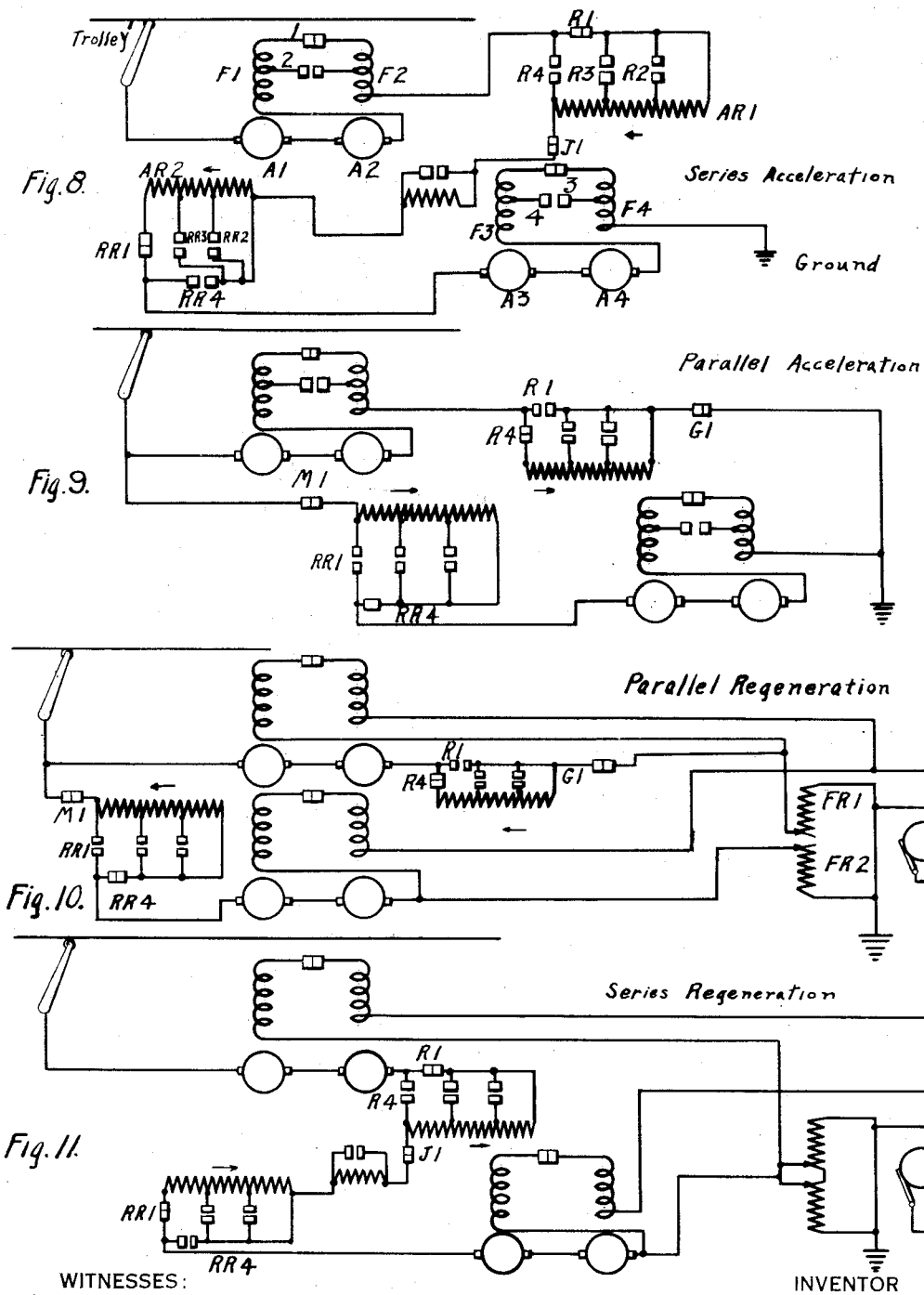

UNITED STATES PATENT OFFICE.

LAURENCE M. PERKINS, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,268,052.      Specification of Letters Patent.      Patented May 28, 1918.

Application filed March 13, 1916. Serial No. 83,724.

*To all whom it may concern:*

Be it known that I, LAURENCE M. PERKINS, a citizen of the United States, and a resident of Wilkinsburg, in the county of Allegheny and State of Pennsylvania, have invented a new and useful Improvement in Systems of Control, of which the following is a specification.

My invention relates to systems of control for dynamo-electric machines and especially to the control of electric railway motors and the like during the regenerative period.

In a co-pending application of A. J. Hall, Serial No. 71,192, filed January 10, 1916, and assigned to the Westinghouse Electric & Manufacturing Company is shown a plurality of relay devices that are severally dependent upon the speed or initial regenerative voltage conditions of a plurality of momentum-driven dynamo-electric machines for respectively effecting the connection of the machines initially in parallel or in series relation across the supply circuit. Another modification therein illustrated comprises a single relay device which is associated with a resistor and certain interlocking means for performing the desired functions.

One object of my invention is to provide a single relay device for accomplishing the above-mentioned results and which is directly associated with the machine circuits and automatically acts to effect initial parallel or series relation of the momentum-driven machine in accordance with the voltage conditions of the armatures thereof, thereby providing a relatively simple and economical means for achieving the desired results.

Another object of my invention is to provide a novel arrangement of main-circuit resistors and controlling switches therefor, whereby a relatively simple and economical system of control, in so far as the feature just recited is concerned, obtains, as hereinafter more fully described.

Figure 1:
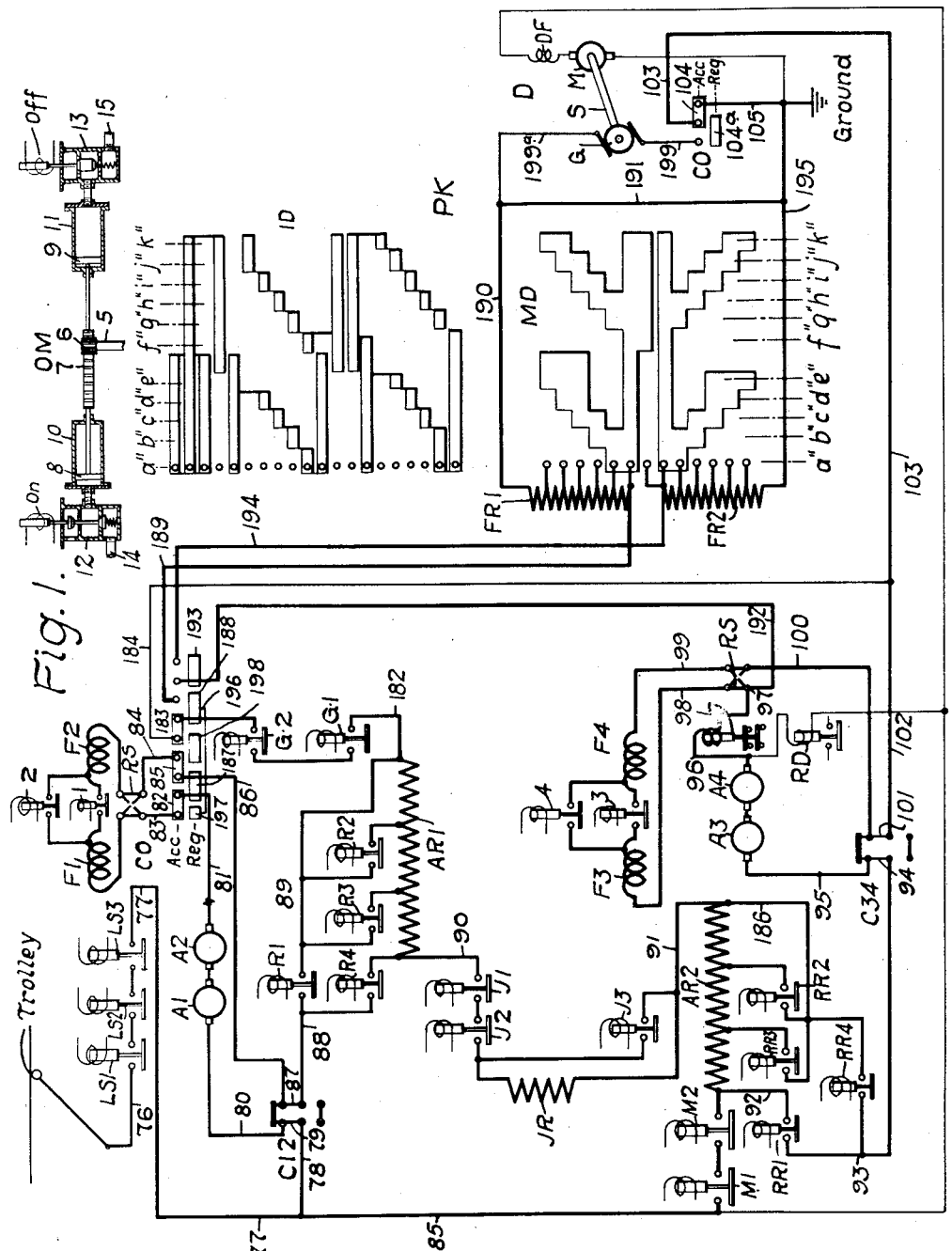
Figure 2:
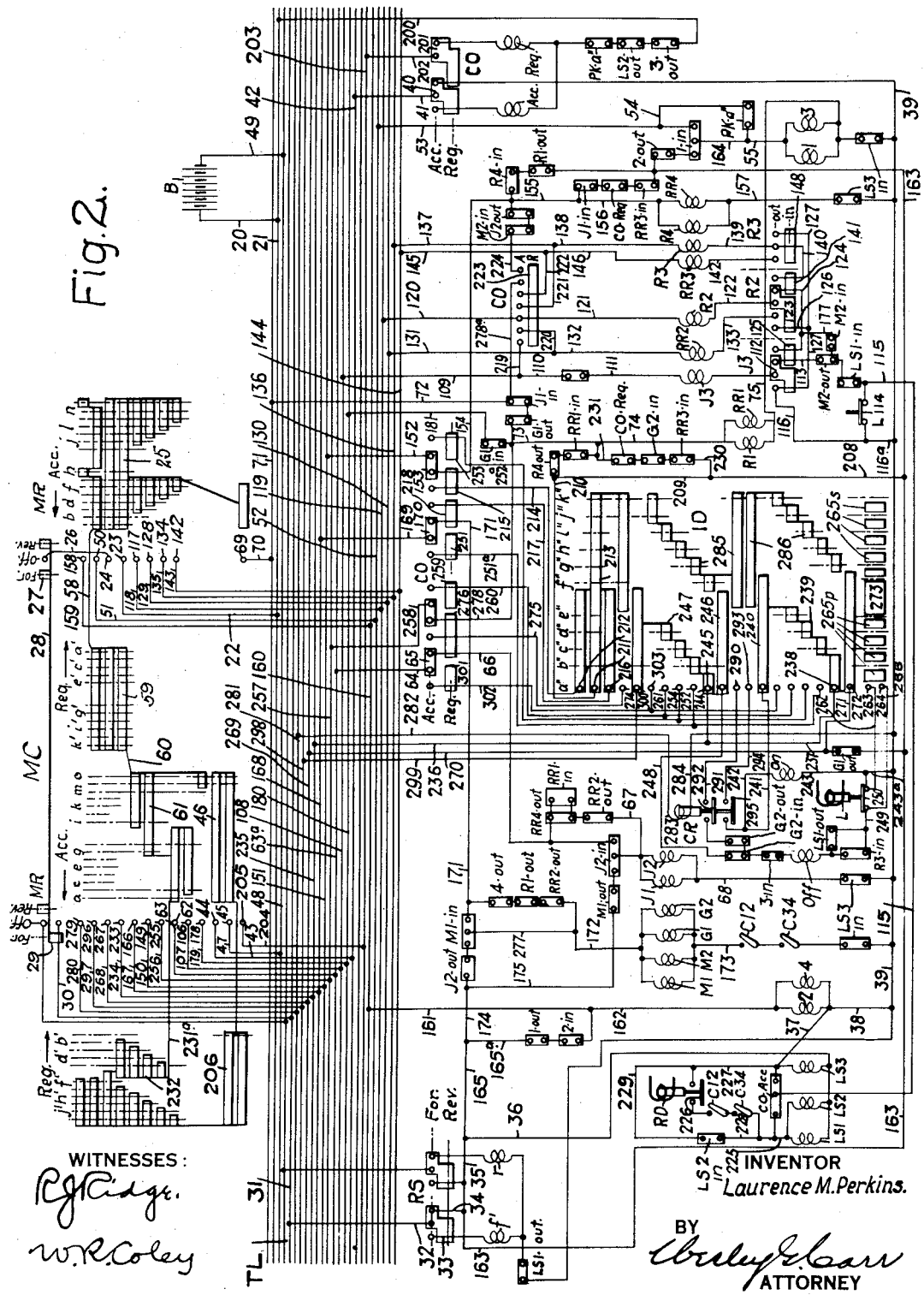

My invention may best be understood by reference to the accompanying drawings, wherein Figure 1 is a diagrammatic view of the main circuits of a system of control embodying my invention; Fig. 2 is a diagrammatic view of the auxiliary governing circuits for manipulating the various circuit-switches that are illustrated in Fig. 1; Fig. 3 and Fig. 4 are sequence charts of well-known form for indicating the desired order of operation of the various switches during the accelerating and regenerative periods, respectively; Fig. 5 is a simplified diagrammatic view that corresponds to Fig. 1; Fig. 6 is a view similar to Fig. 5 of a modified type of control system to which my invention is applied; Fig. 7 is a detailed diagrammatic view of one of the complete main-circuit switches that are shown in Fig. 1; and Fig. 8 to Fig. 11, inclusive, are simplified diagrammatic views corresponding to different operating connections, as indicated by the accompanying legends.

Referring to Fig. 1, the system shown comprises a plurality of suitable supply-circuit conductors respectively marked Trolley and Ground; a plurality of dynamo-electric machines respectively having armatures A1, A2, A3 and A4 and sub-divided field-magnet windings F1, F2, F3 and F4 of the series type; a reversing switch RS, here shown conventionally, but preferably of a familiar electrically-controlled type, as indicated in the auxiliary circuits of Fig. 2, for reversing the electrical relations of the several main armatures and field windings; a main-circuit resistor AR1 with which is associated, in a novel manner, a plurality of suitable short-circuiting switches R1, R2, R3 and R4; a second main-circuit resistor AR2 with which is similarly associated a plurality of switches RR1, RR2, RR3 and RR4; a third main-circuit resistor JR that is adapted to be short-circuited by a switch J3; a plurality of motor-controlling switches LS1, LS2, LS3, J1, J2, M1, M2, G1 and G2; a plurality of suitable motor-cut-out switches C12 and C34 that are respectively associated with the pairs of armatures A1 and A2, and A2 and A4, for the customary purposes of excluding the one or the other set of motors from circuit in case of injury thereto; a plurality of switches 1 and 2, and 3 and 4 that are respectively associated with the pairs of main field windings F1 and F2, F3 and F4 for effecting the well-known "field-control" connections; a limit switch L of a familiar type; a change-over switch CO, preferably of the drum type and electrically controlled, as explained in connection with Fig. 2, for arranging certain of the main-motor, and also the auxiliary, circuits during both the accelerating and regenerative periods in accordance with its occupation of the positions marked Acc.

and Reg.; a field-circuit controlling device PK of the drum type, having an operating mechanism OM, for varying the active value of a plurality of resistors FR1 and FR2 that are disposed in circuit with the main field windings during the regenerative period, as set forth later; a motor-generator or dynamotor D of a familiar type for supplying exciting energy to the main field-winding circuits during the regenerative period; and my relay device RD, which is associated with the main and the auxiliary circuits in a manner to be described.

The motors are here shown as being operated in pairs of permanently-connected armatures and of field windings, and groups of switches are provided in several cases to provide a series of breaks, whereby the particular system to be described is adapted for relatively high-voltage operation, such as 1500 volts direct-current. However, it will be understood that the novel features of my invention are applicable to various other control systems, and the number and arrangement of motors, in general, are immaterial to the present invention.

The dynamotor D is shown as comprising a driving or motor armature M that is connected through a suitable field winding DF across the supply circuit, and a generator or exciting armature winding G that is preferably disposed upon the same shaft as the motor armature. However, it will be appreciated that any other suitable type of dynamotor or an equivalent motor-generator set may be employed, if desired, and the customary functions of such a machine, for example, driving air-compressors and furnishing energy for various auxiliary circuits, may be utilized, if deemed advisable.

The relay device RD is preferably of a familiar solenoid type, and the actuating coil thereof is connected from the higher-voltage terminal of the switch M1 to the lower-voltage terminal of the armature A4. (See also Fig. 5). It will be observed that when the parallel-connecting switches M1 and M2 and G1 and G2 are closed, the relay device receives the voltage of each of the parallel-related sets of armatures, while, upon the closure of the series-connecting switches J1 and J2 and the opening of the parallel-connecting switches, the relay device is energized in accordance with the combined voltages of the two sets of armatures, for regenerative purposes to be set forth.

The control device PK comprises a main drum portion MD that is provided with suitable stationary and movable contact members for gradually short-circuiting the field-circuit resistors FR1 and FR2 as the drum is moved through its successive positions $a''$ and $e''$ which correspond to parallel operation of the momentum-driven machines, and for again gradually short-circuiting the field-circuit resistors as the drum is actuated through its successive positions $f''$ to $k''$ which correspond to series connection of the regenerating machines. An auxiliary interlocking drum ID is rotatable with the main drum MD, being preferably mounted on the same shaft 5, and is employed for the purpose of controlling the operation of the mechanism OM as described in connection with Fig. 2, whereby a step-by-step movement of the PK controller is effected.

The operating mechanism OM is of a familiar type and comprises a pinion 6 that is rigidly secured to the end of the shaft 5 of the PK controller and meshes with a horizontally-movable rack member 7, with the ends of which a plurality of pistons 8 and 9 are respectively associated. A plurality of suitable operating cylinders 10 and 11 are provided for the pistons 8 and 9 and a plurality of valve members 12 and 13 are adapted to admit fluid pressure from any suitable source (not shown) through pipes or passages 14 and 15, respectively, in accordance with predetermined conditions to be described. The valve 12 is normally closed to exclude fluid-pressure from the cylinder 10 and to permit communication of the cylinder with the atmosphere. An actuating coil On is provided for controlling the action of the valve 12. On the other hand, the valve 13 is normally open to admit fluid-pressure to the cylinder 11, whereby the operating mechanism is biased to the position shown, and an actuating coil Off is supplied for closing the valve 13, as described in connection with Fig. 2.

To effect forward movement of the controller PK, the on and the off coils are simultaneously energized, whereupon initial unbalanced fluid-pressure conditions are reversed to actuate the pistons toward the right. If it is desired to arrest the controller movement at any point, the off coil is deënergized, and balanced-pressure conditions obtain in the two cylinders, thus positively and reliably stopping the controller. To effect return movement, it is merely necessary to deënergize both coils, whereby the initial unbalanced-pressure conditions are restored and the pistons are moved to the illustrated position.

The auxiliary governing system that is shown in Fig. 2 comprises, in addition to the actuating coils of the various switching devices that are illustrated in Fig. 1, a plurality of interlocking contact members of a familiar type that are illustrated in Fig. 7 in connection with the switch LS1, and the interlocking drum ID, a master controller MC that is adapted to occupy a plurality of operative positions $a$ to $o$, when operated in one direction that corresponds to acceleration of the motors, and a plurality of operating positions $a'$ to $k'$, when moved in the opposite direction that corresponds to regeneration of the momentum-driven machines; a master reverser MR of a familiar type; a suitable source of energy, such as a battery B, for energizing the various actuating coils through the master controller MC and through a plurality of train-line conductors TL, whereby multiple-unit operation of my system may be readily effected, as will be understood; a control relay CR, for a purpose to be described; and certain auxiliary contact members of the change-over switch CO, the limit switch L and the relay device RD, which closes certain auxiliary circuits in a manner to be set forth.

Assuming that it is desired to effect acceleration of the main motors, the master controller MC may be actuated to its initial accelerating position $a$, provided that the master reverser MR and the main reversing-switch RS occupy their forward positions, as illustrated, whereupon one circuit is established from the positive terminal of the battery B through conductor 20, train-line conductor 21, conductor 22, control fingers 23 and 24 which are bridged by contact segment 25 of the master controller in its position $a$, conductor 26, contact member 27, conductor 28 and contact member 29 of the master reverser MR in its forward position, conductor 30, train-line conductor 31, conductor 32, contact member 33 of the main reversing-switch RS in its forward position, conductors 34, 35 and 36, the actuating coil of the switch LS3, and also from conductor 36 through the parallel-related actuating coils of the switches LS1 and LS2 and an interlock CO—Acc., whence circuit is completed through conductors 37, 38 and 39, contact member 40 of the change-over switch CO in its position Acc., conductor 41, train-line conductor 42, conductor 43, control fingers 44 and 45 which are bridged by contact segment 46 of the master controller, conductor 47, train-line conductor 48 and conductor 49 to the negative terminal of the battery B. The switches LS1, LS2 and LS3 are thus closed as indicated in the sequence chart of Fig. 3.

Another circuit is simultaneously established from the contact segment 25 of the master controller through control finger 50, conductor 51, train-line conductor 52, conductors 53 and 54, interlock PK—$a''$, conductor 55, the parallel-related actuating coils of the field-circuit switches 1 and 3 and interlock LS3—in to the negative conductor 39.

A further circuit is established at this time from the contact segment 25 of the master controller through conductor 58, contact segment 59, conductor 60, contact segment 61 and control finger 62 of the various sections of the master controller; conductor 63, train-line conductor $63a$, conductor 64, contact member 65 of the change-over switch CO in its position Acc., conductor 66, interlocks RR4—out and RR2—out, conductor 67, the parallel-related actuating coils of the switches J1 and J2, conductor 68 and the interlock LS3—in to the negative conductor 39. Upon the closure of the switch J2, a holding circuit therefor is formed by interlock J2—in which directly connects conductors 66 and 67.

Still another circuit is established in position $a$ of the master controller from contact segment 25 through control fingers 69, conductor 70, train-line conductor 71, conductor 72, interlocks J1—in and G1—out, conductors 73 and 74, the parallel-connected actuating coils of the switches R1 and RR1, conductor 75 and interlock LS3—in to the negative conductor 39.

Referring temporarily to the main circuits that are shown in Fig. 1, the closure of the various switches that have been mentioned completes a main circuit from the trolley through conductor 76, the switches LS1, LS2 and LS3, conductors 77 and 78, one blade 79 of the cutout switch C12, conductor 80, the armatures A1 and A2, conductor 81, contact member 82 of the change-over switch CO in its position Acc., conductor 83 and certain contact members of the reversing-switch RS, field winding F1, switch 1, field winding F2, reversing switch RS, conductor 84, contact member 85 of the change-over switch CO, conductor 86, a second blade 87 of the cutout switch C12, conductor 88, switch R1, conductor 89, the entire resistor AR1, conductor 90, switches J1 and J2, resistor JR, conductor 91, the entire resistor AR2, conductor 92, switch RR1, conductor 93, one blade 94 of the second motor cutout switch C34, conductor 95, armatures A3 and A4, conductor 96, the actuating coil of the limit switch L, conductor 97, reversing switch RS, conductor 98, field winding F3, switch 3, field winding F4, conductor 99, reversing-switch RS, conductor 100, the second blade 101 of the cutout switch C34, conductors 102 and 103, contact member 104 of the change-over switch CO in its position Acc., and conductor 105 to the negative supply-circuit conductor Ground. See Fig. 8.

Referring again to Fig. 2, when the master controller MC is actuated to its second accelerating position $b$, a circuit is established from the positively energized contact segment 61, through control finger 106, conductor 107, train-line conductor 108, conductors 109 and 110, interlock J1—in, conductor 111, the actuating coil of the switch J3, interlock 112—J3—out, conductor 113, interlock M2—out, interlock LS1—in, conductor 115, contact member CO—Acc. and conductors 37 and 38 to the negative conductor 39. As soon as the switch J3 is closed, an additional holding circuit therefor is completed from the actuating coil thereof through interlock 112—J3—in and conductors 116 and 116ª to conductor 39, which additional circuit is employed in connection with certain other resistor-short-circuiting switches, as about to be described.

In position c of the master controller, the contact segment 25 engages control finger 117, whence circuit is completed through conductor 118, train-line conductor 119, conductors 120 and 121, the actuating coil of the switch R2, conductor 122, interlock 123—R2—out, conductor 124, interlock 125—J3—in, and thence through conductor 113, as previously described. Upon the closure of the switch R2, a holding circuit therefor is completed from conductor 122, through interlock 123—R2—in, and conductors 126 and 127, to the conductor 116.

In position d of the master controller, a circuit is completed from the contact segment 25 through control finger 128, conductor 129, train-line conductor 130, conductors 131 and 132, the actuating coil of the switch RR2, conductor 133, and thence through interlock 123—R2—in, as already set forth.

In position e, a circuit is completed from the contact segment 25 through control finger 134, conductor 135, train-line conductor 136, conductors 137, and 138, the actuating coil of the switch R3, conductors 139 and 140, interlock 141—R2—in, and thence through conductor 124, as previously described.

In position f, a further circuit is completed from the contact segment 25 through control finger 142, conductor 143, train-line conductor 144, conductors 145 and 146, actuating coil of the switch RR3, conductor 147 and interlock 148—R3—in, a common holding circuit for the switches R3 and RR3 being completed from the interlock 148 through conductor 127 to the conductor 116.

In position g, a circuit is established from the contact segment 61 of the master controller through control finger 149, conductor 150, train-line conductor 151, conductor 152, contact member 153 of the change-over switch CO in its position Acc., conductors 154, 155 and 156, the actuating coils of the switches R4 and RR4, conductor 157 and interlock LS3—in to the negative conductor 39. In position g, the initial energizing circuit of the actuating coils of the switches R1 and RR1 are also opened after the closure of the switches R4 and RR4, by reason of the disengagement of the control finger 69 from the contact segment 25. Such action, however, does not vary the main-circuit resistance since direct shunting paths around the main-circuit resistors AR1 and AR2 are provided through the switches R4 and RR4, respectively. An open-main circuit at this time is prevented by the use of a holding circuit including conductors 35, 163, 208 and 209, interlocks R4—out and RR1—in and conductor 74 which is connected to the R1 and RR1 switch-actuating coils, thus preventing the opening of switches R1 and RR1 until the closure of switches R4 and RR4, as more fully set forth below in connection with the switches 1 and 3, and 2 and 4.

In position h, a circuit is established from the contact segment 25 through control finger 158, conductor 159, train-line conductor 160, conductors 161 and 162, the actuating coils of the field-circuit switches 2 and 4 and conductor 38 to the negative conductor 39. The switches 2 and 4 are thus closed while the initial energizing circuit of the associated switches 1 and 3 is opened by reason of the disengagement of the control finger 50 from the contact segment 25 of the master controller, whereby the well-known "normal field" connections are provided to effect a predetermined additional degree of motor acceleration, in accordance with familiar principles. It should be noted that, by reason of the peculiar arrangement of interlocking contact members, the switches 1 and 3 cannot open until the switches 2 and 4 have closed, thus preventing an open main circuit, such interlocking connection including conductors 34 and 163, complementary interlocks 2—out and 1—in, and conductor 164 and conductor 55 which is connected to the actuating coils of the switches 1 and 3, thus insuring the energization of the actuating coils of these switches until the switch 2 has closed to interrupt the circuit between conductor 163 and interlock 1—in.

In position h, the switches R2, RR2, R3 and RR3 are also opened by reason of the disengagement of the contact segment 25 from the corresponding control fingers.

To effect initial parallel connection of the motors, the master controller may be moved toward its position i, whereupon, at first, the contact segment 25 is disengaged from the control finger 158 and again engages control finger 50, thus effecting the closure of the switches 1 and 3 and the subsequent opening of switches 2 and 4 to again produce "full field" conditions in the motors. A similar interlocking arrangement to that just recited is also provided in this case and comprises conductors 35, 165 and 165a, complementary interlocks 1—out and 2—in and conductor 162 which is connected to the actuating coils of the switches 2 and 4. Consequently, the energizing circuit for the actuating coils in question is maintained until such circuit is interrupted by the exclusion of the interlock 1—out when the switch 1 is closed.

Just before the master controller reaches its position i, the contact segment 61 engages control finger 166, whence circuit is completed through conductor 167, train-line conductor 168, conductor 169, contact member 170 of the change-over switch CO in its position Acc., conductor 171, interlocks 4—out, R1—out and RR2—out, conductor 172, the parallel-related actuating coils of the switches M1, M2, G1 and G2, conductor 173, switches c12 and c34 that are associated with the motor-cutout switches C12 and C34 in a familiar manner and interlock LS3—in to the negative conductor 39.

Immediately after the closure of the switches just mentioned, the contact segment 61 of the master controller becomes disengaged from the control fingers 62 and 106, thereby deënergizing the previously described circuits of the actuating coils of the switches J1, J2 and J3, respectively. However, the opening of the switches J1 and J2 before the closure of the switches M1, etc., is prevented by an interlocking arrangement similar to that set forth in connection with the field-circuit switches, namely, comprising conductors 165, 174 and 175, interlock M1—out and interlock J2—in which is connected directly to the actuating coils of the switches J1 and J2. Thus, the energization of the J1 and J2 actuating coils is maintained through the holding circuit just recited until the switch M1 closes to interrupt the connection between conductor 175 and interlock J2—in.

Referring, for the time being, to Fig. 1, the main circuits that are established in the initial parallel connections of the motors that correspond to position $i$ of the master controller may be set forth as follows: from the trolley through the main armatures A1 and A2, main field windings F1 and F2, switch R4, and the resistor AR1, as previously described, conductor 182, switches G1 and G2, contact member 183 of the change-over switch CO in its position Acc., conductor 184 and conductor 103 to the negative supply-circuit conductor ground, as already traced. The circuit of the other motor is completed from the trolley through conductors 76, 77 and 185, switches M1 and M2, the resistor AR2, conductor 186, switch RR4, conductor 93 and thence through the other motors to ground, as previously described. The set of motors having the armatures A1 and A2 and the resistor AR1 thus comprises a circuit that is disposed in parallel relation to a circuit including resistor AR2 and the motors having the armatures A3 and A4. See Fig. 9.

In position $j$ (Fig. 2) the contact segment 25 reëngages control finger 117, whence circuit is established as previously recited through the actuating coil of the switch R2 and thence through the interlock 123—R2—out, conductors 124 and 177, interlocks M2—in and LS1—in and thence through conductor 115 to the negative battery terminal as previously described. Upon the closure of the switch R2, the hereinbefore described holding circuit for the actuating coil thereof is again completed.

In the next three positions $k$, $l$ and $m$ of the master controller, the control fingers 128, 134 and 142 respectively make contact with the contact segment 25 to effect the closure of switches RR2, R3 and RR3, as previously set forth.

In position $n$, the contact segment 61 of the master controller engages control finger 178, whence circuit is completed through conductor 179, train-line conductor 180, conductor 181, interlock G1—in and conductors 73 and 74 to the actuating coils of the switches R1 and RR1 in accordance with a circuit already traced. Although the resistor-short-circuiting switches are manipulated during the parallel operation of the motors in a different sequence from that employed during the series acceleration of the motors, it will be observed that the change of sequence is necessary by reason of the altered relations of the main-circuit resistors with respect to the motors, and, in either case, the manipulation of the switches is such as to gradually effect acceleration of the motors.

More specifically stated, the switches R1 and RR1 are initially employed, whereby the current traverses the corresponding resistors in a certain direction during series acceleration; whereas the switches R4 and RR4 are employed during the first portion of parallel acceleration, and the current traverses the main resistors in the opposite direction. However, by connecting the intermediate switches; R2 and R3, for example, from intermediate points of the resistor AR1 to the terminal of the switch R1 that is remote from the armature A2, the same sequence of operation of the intermediate switches may be employed during both series and parallel operation, which is desirable for manufacturing and commercial reasons.

In the final position $o$ of the master controller, the contact finger 158 again engages contact segment 25, while the control finger 50 again breaks contact with the segment 25. Consequently, the "normal field" connections are again effected in a manner similar to that accomplished at the end of the series accelerating period.

Assuming that the vehicle is coasting at a relatively high speed and that it is desired to effect regenerative operation of the system, the master controller MC may be actuated to its initial regenerative position $a'$, whereupon a circuit is first established from the positive terminal of the battery B through conductor 20, train-line conductor 21, conductor 200, interlocks 3—out, LS2—out and PK—$a''$, the actuating coil Reg. of the change-over switch CO, contact member 201 of the change-over switch in its position Acc., conductor 202, train-line conductor 203, conductor 204, control fingers 205 and 45 which are bridged by contact segment 206 of the master controller in its position $a'$ and thence through conductor 47 to the negative battery terminal, as already described in connection with the motor acceleration. The change-over switch is thus actuated to its regenerative position Reg., in a well-known manner.

Another circuit is established from the positively energized contact segment 59 of the master controller through the master reverser to conductor 36, as hereinbefore described, and thence through the actuating coil of the switch LS3 and conductors 37 and 38 to the negative conductor 39. The switches LS1 and LS2 are not closed simultaneously with the switch LS3 by reason of the exclusion of the contact member CO—Acc. from the energizing circuits of their actuating coils. The closure of the switches LS1 and LS2 is entirely dependent upon the upward actuation of the relay device RD, which takes place, under suitable regenerative conditions, in a manner to be described.

A further circuit is established from the conductor 34 through conductors 163, 208, 209 and 210, control fingers 211 and 212, which are bridged by contact segment 213 of the interlock drum ID, conductor 214, contact member 215 of the change-over switch CO in its position Reg. and conductor 154 to the actuating coils of the switches R4 and RR4, as hereinbefore described.

A circuit is established simultaneously from the contact segment 213 of the interlock drum ID through control finger 216, conductor 217, contact member 218 of the change-over switch and thence through conductor 171 to the actuating coils of the switches M1, M2, G1 and G2, as already traced.

The actuating coils of the switches 1 and 3 are also initially energized by reason of the engagement of control finger 50 with contact segment 59 of the master controller in position $a'$.

In the meantime, the field windings of the main machines are excited by the generator armature G in accordance with circuits about to be traced, and the voltage of the main momentum-driven armatures is thus built up to a point where the combined effect of the machine speed and field excitation suffices to produce a voltage across each of the two sets of armatures A1 and A2, A3 and A4, or, in other words, impresses a voltage upon the actuating coil of the relay device RD, that is preferably higher than the supply-circuit voltage by a predetermined amount, whereupon, the relay device is actuated to its upper position to complete the circuit of the actuating coils of the switches LS1 and LS2 from the conductor 36 through the actuating coils, conductor 225, switches $c$34 and $c$12 that are associated with the motor-cutout switches C34 and C12, auxiliary contact members 226 of the relay device RD in its upper or closed position, and conductor 227 to the negatively-connected conductor 37. Upon the closure of the switch LS2, a holding circuit therefor is formed from conductor 225, through conductor 228, interlock LS2—in, and conductor 229 to conductor 227, whereby the auxiliary contact members of the relay device RD are bridged, and the device is inoperative with respect to varying the circuit connections during the remainder of the regenerative operation.

Upon the closure of the switch LS1, the previously-mentioned interlock LS1—in completes the circuits of the actuating coils of the switches RR2, R2, R3 and RR3, which are respectively connected through conductors 220, 121, 221, and 222 to suitable control fingers that are joined by a contact member 223—CO—Reg., to which energy is supplied from the conductor 154 through interlock J2—out and M2—in and conductor 224. In this case, however, the conductor 115 is open-circuited, and circuit is completed from interlock LS1—in through contact members 114 of the limit switch L and conductor 116$a$ to the negative conductor 39.

The progressive closure of the resistor-short-circuiting switches just mentioned thus occurs a short time after the closure of the switch LS1 to short-circuit the main resistors AR1 and AR2.

Referring temporarily to the main circuits that are shown in Fig. 1, the connections that are established by actuation of the change-over switch CO and the closure of the switches just recited may be set forth as follows: one circuit is completed from the lower-voltage terminal of the armature A2, through conductor 81, contact member 187, of the change-over switch CO in its position Reg., conductor 86, blade 87 of the cutout switch C12, conductor 88, switch R1, conductors 89 and 182, switches G1 and G2, contact member 188 of the change-over switch, conductor 189, field-regulating resistor FR1 and conductors 190 and 191 to the negative supply-circuit conductor Ground. A similar circuit for the other set of motors is completed from the lower-voltage terminal of the armature A4 through conductor 96, the actuating coil of the limit switch L, conductors 97 and 192, contact member 193 of the change-over switch, conductor 194, field-regulating resistor FR2 and conductor 95 to the negative supply-circuit conductor Ground. The two sets of motor armatures are thus respectively connected in series relation with the regulating resistors FR1 and FR2 across the supply circuit. See Fig. 10.

A further main circuit is established from the contact member 188 of the change-over switch through conductor 196, contact member 197, conductor 83, the complete field windings F1 and F2, conductor 84, contact member 198 of the change-over switch, conductors 184 and 103, contact member 104a of the change-over switch in its position Reg., conductor 199, the exciting armature G and conductor 199a to the conductor 190. A similar circuit for the other set of field windings is completed from the conductor 97 through conductor 98, the field windings F3 and F4, conductors 99 and 100 and thence to conductor 103 and the exciting armature G as just described. The exciting armature G is thus connected to excite the sets of main field windings through the resistors FR1 and FR2, respectively. However, such arrangement of main-circuit connections forms no material part of my present invention, but is fully shown and described in a co-pending application of R. E. Hellmund, Serial No. 44,443, filed August 9, 1915, and assigned to the Westinghouse Electric & Manufacturing Company.

A further auxiliary circuit is then established from the conductor 208 through conductor 230, interlocks RR3—in, G2—in and CO—Reg. and conductors 231 and 74 through the actuating coils of the switches R1 and RR1, as previously set forth.

When the master controller is moved to its second regenerative position $b'$, a circuit is completed from the contact segment 232, which is connected by conductor 231a to the segment 61 of the master controller, through control finger 233, conductor 234, train-line conductor 235, conductor 236, where the circuit divides, one branch including conductor 237, control finger 238, contact segment 239 and control finger 240 of the interlock drum ID, conductors 241 and 242, the actuating coil On and conductors 243 and 243a to the negative conductor 39, and the other branch including conductor 244, control fingers 245 and 246, which are bridged by contact segment 247, conductor 248, interlocks G2—in and 3—in, the actuating coil Off, interlock R3—in, conductor 249, auxiliary contact members 250 of the limit switch L in its lower or operative position, and thence through conductor 243a to the negative conductor 39. Inasmuch as the two actuating coils On and Off of the PK controller are simultaneously energized, forward movement of the controller to its position $b''$ occurs in accordance with the principles already set forth.

In position $b''$ of the interlock drum, the circuit of the actuating coil On is maintained by the engagement of the control finger 238 with the contact segment 239, while the control finger 245 becomes disengaged from the contact segment 247, thereby de-energizing the actuating coil Off and, consequently, effecting the previously-described balanced-pressure conditions in the operating mechanism OM to positively and reliably stop the PK controller in position $b''$.

In position $c'$ of the master controller, the contact segment 232 engages control finger 166, whence circuit is completed through conductor 167, train-line conductor 168, conductor 169, contact segment 251 of the change-over switch, conductor 251a and control finger 252 which is connected to contact segment 247 of the interlock drum ID in position $b''$ thereof. The two actuating coils On and Off are thus again simultaneously energized and the PK controller is actuated to its position $c''$, whereupon the control finger 252 is disconnected from the contact segment 247, while the contact segment 239 engages another control finger that corresponds to control finger 252 and thus maintains the energization of the on actuating coil.

In position $d'$, contact segment 232 engages control finger 149, whence circuit is completed through conductor 150, train-line conductor 151, conductor 152, contact member 253 of the change-over switch, conductor 253a and control finger 254 which engages contact segment 247 of the interlock drum in position $c''$ and thus permits movement of the drum in the manner already described as far as position $d''$.

In position $e'$ of the master controller, a control finger 255 engages the contact segment 232, whence circuit is completed through conductor 256, train-line conductor 257, conductor 258, contact member 259 of the change-over switch CO, conductor 260 and control finger 261 which engages the contact segment 247 of the interlock drum in position $d''$ and thus permits movement of the drum to position $e''$, which corresponds to the last parallel position of the regenerating armatures.

It will be observed that one of the stationary contact members of the limit switch L is connected through conductor 262, control fingers 263 and 264 which are intermittently bridged by a plurality of contact members 265p and 265s during a predetermined portion of the movement of the control drum from notch to notch, and conductor 266 to the other stationary contact member of the limit switch. It was found that, when the limit switch was actuated to its upper or open position by reason of a predetermined increase of current, the controller PK at times tended to overshoot the desired position and to stick in a position intermediate the notches thereby, burning contact members, etc., or in other words, the energization of the actuating coil Off was not maintained for the exact length of time necessary to insure the proper movement of the controller from one position to the next. Consequently, by short-circuiting the limit-switch contact members between successive notches of the controller by the contact members 265p and 265s, such undesirable results are entirely obviated, and the controller moves forward positively and definitely from notch to notch.

However, it should be observed that the limit switch L may or may not be employed, that is to say, the master controller may be manipulated by the train operator in such manner that the limit switch will not be actuated, but under ordinary braking conditions, the limit switch is preferably employed, so that, when the machine current exceeds a predetermined value, the limit switch L lifts to temporarily interrupt the circuit of the actuating coil Off and thus arrest the movement of the controller PK. It will be understood that, when the limit switch is utilized, the master controller may be initially actuated to its positions $e'$ or $k'$, and the controller PK will then advance from notch to notch in accordance with the action of the limit switch L, as is familiar practice.

If the master controller MC is moved toward its initial series position $f'$, a circuit is first established from the contact segment 232 through control finger 267, conductor 268, train-line conductor 269, conductors 270 and 271 and control finger 272 which engages the contact segment 239 of the interlock drum and, consequently, maintains the energization of the actuating coil On during the transitional movement of the controller PK. A new circuit for similarly maintaining the energization of the off coil circuit comprises control finger 296 which engages contact segment 232, conductor 297, train-line conductor 298, conductor 299 and control finger 300 which makes contact with segment 247 until just before position $f''$ of the interlock drum ID is reached.

The control fingers 263 and 264 are also bridged by contact segment 273 between the positions $e''$ and $f''$ of the controller PK, thus bridging the stationary contact members of the limit switch L and serving to maintain the actuating coil Off energized to insure the movement of the controller PK to its initial series position $f''$.

As soon as the controller PK passes beyond its position $e''$, the contact segment 213 engages control finger 274, whence circuit is completed through conductor 275, contact member 276 of the change-over switch CO, where the circuit divides, one branch including conductor 66, interlocks RR1—in and RR2—out, since the contact segment 232 disengages the corresponding control fingers of the master controller during the movement thereof to position $f''$, and thence through conductor 67 to the actuating coils of the switches J1 and J2, as previously set forth, and the other branch including conductor 278, interlock G1—out as soon as the switch G1 has opened, as about to be set forth, interlock J1—in and conductor 278a to the contact member 223—CO—Reg., thereby effecting the progressive closure of switches RR2, R2, R3 and RR3.

The switch J3 is also closed at this time by reason of the completion of a circuit from the interlock 223—CO—Reg. through conductors 219, 110, interlock J1—in and conductor 111 whence circuit is completed in accordance with circuits already traced. In addition, a circuit is completed from the positively energized conductor 163, through interlocks RR3—in, CO—Reg., and J1—in and conductor 156 through the actuating coils of the switches R4 and RR4, as previously described.

The initial coil-energizing circuits of the switches M1, M2, G1 and G2 are also opened by reason of the disengagement of the contact segment 232 from the corresponding control finger 166 during the transitional movement of the master controller, although the opening of these switches is prevented until the switches J1 and J2 are closed by reason of an interlocking arrangement similar to that hereinbefore set forth in connection with the transition from series to parallel acceleration of the motors, such interlocking arrangement comprising the positively-energized conductor 174, interlocks J2—out and M1—in and conductors 277 and 172 to the actuating coils of the switches M1, M2, G1, and G2, thus insuring that the switches J1 and J2 shall be closed before the holding circuit just described for the switches M1, etc., is interrupted by the exclusion of the interlock J2—out upon the closure of the switch J2. See Fig. 11 for the simplified main-circuit connections at this period.

As soon as the master controller reaches its initial series position $f'$, one circuit is completed from the contact segment 232 through control finger 279, conductor 280, train-line conductor 281, conductor 282, actuating coil 283 of the control relay CR and conductor 284 to the negative conductor 39.

As soon as the interlock drum ID passes beyond its position $e''$, a plurality of contact segments 285 and 286 that respectively correspond to contact segments 247 and 239 engage control fingers 290 and 293, whence one circuit is completed through conductor 291, coöperating contact member 292 of the control relay CR in its upper or closed position, interlocks G2—out and 3—in and thence through the off coil in accordance with a circuit that has hereinbefore been traced, while the other circuit is completed from control finger 293 through conductor 294, coöperating contact members 295 of the control relay, conductor 242 and thence through the actuating coil On as previously set forth.

When the controller PK occupies its position $f''$ the control finger 244 engages contact segment 285 and the control fingers 272 and 240 still engage the contact segment 239.

Upon actuation of the master controller to its position $g'$, the contact segment 232 engages control finger 233, whence the control finger 244 is energized to complete the circuit of the actuating coil Off and thus permit movement of the controller PK to its position $g''$, wherein the control fingers 272 and 240 become disengaged from contact segment 239 and control fingers 238 and 293 engage contact segment 286 to maintain the energization of the On actuating coil.

Upon movement of the master controller through its positions $h'$, $i'$ and $j'$, the control fingers 166, 149 and 255 are successively energized, thus completing the corresponding circuits to permit a corresponding step-by-step actuation of the controller PK.

In the final position $k'$ of the master controller the contact segment 232 engages control finger 62 whence circuit is completed through conductor 64 as hereinbefore described, contact member 301 of the change-over switch CO, conductor 302 and control finger 303 which engages contact segment 285 and thus effects the movement of the controller PK to its final position $k''$.

As previously mentioned, the foregoing description considers the case wherein the regenerative machines are operated at a relatively high speed so that initial parallel regenerative operation is permissible.

However, if the speed of the machines is sufficiently low to preclude the possibility of employing parallel-connected regeneration even though the controller PK is actuated to its final parallel position $e''$ to fully excite the main field windings, the further movement of the master controller MC will effect the energization of the control relay and, consequently, of the actuating coils On and Off and thus effect a step-by-step movement of the controller PK until the voltage across the series-related main armatures preferably exceeds the supply-circuit voltage by a predetermined amount, whereupon the relay device will be actuated to its upper position to close the line switches LS1 and LS2 in accordance with the previously traced circuits, and regeneration will take place from that point on to the final position of the controller PK.

Although I have shown and described my relay device in connection with a certain type of system that is more or less complicated, it is believed that a materially simpler set of circuit connections would not fully set forth all the advantages accruing from the use of my invention. However, the general layout of the regenerative system with respect to my relay device RD is shown in a simplified manner in Fig. 5.

The system of Fig. 6 shows the manner in which my relay device RD can be employed in connection with the well-known "shunting" type of transition of a plurality of dynamo-electric machines wherein the switch S is employed during series machine connection and the switches P and G during parallel operation. In this case one terminal of the relay device actuating coil is connected to a point intermediate the switch P and the higher-voltage terminal of the armature A1 and the other terminal of the actuating coil is connected to the lower-voltage terminal of the armature A2. Consequently, when the switches P and G are closed, that is, during parallel connection of the main machines, the relay-device actuating coil has impressed upon it the voltage of one armature, while upon the series connection of the machines by closure of the switch S, the actuating coil receives the combined voltage of the two armatures, in a manner similar to that described in connection with Fig. 1.

Various novel features of the above-described control system are more fully set forth and are claimed in application of A. J. Hall, Serial No. 83,732, filed Mar. 13, 1916, and assigned to the Westinghouse Electric and Manufacturing Company.

I do not wish to be restricted to the specific circuit connections and arrangement and location of parts herein set forth, as various modifications thereof may be effected without departing from the spirit and scope of my invention and I desire, therefore, that only such limitations shall be imposed as are indicated in the appended claims.

I claim as my invention:

1. In a system of control, the combination with a supply circuit and a plurality of dynamo-electric machines adapted for regenerative operation, of a single means directly dependent upon initial regenerative voltage conditions of said machines for selectively grouping the machines in accordance with the relation of such voltage conditions to supply-circuit voltage conditions.

2. In a system of control, the combination with a supply circuit and a plurality of dynamo-electric machines adapted for regenerative operation, of a single electromagnetic means directly associated with said machines for effecting the selective grouping of the machines under different regenerative conditions in such manner that the voltage of each group approximately equals the supply-circuit voltage.

3. In a system of control, the combination with a supply circuit and a plurality of dynamo-electric machines adapted for regenerative operation, of a single relay device having its actuating coil directly connected to the main machine circuits for effecting the selective grouping of the machines under different conditions in such manner that the voltage of each group approximately equals the supply-circuit voltage.

4. In a system of control, the combination with a supply circuit and a plurality of dynamo-electric machines adapted for regenerative operation, of a single relay device having its actuating coil directly connected to the main machine circuits for effecting the connection of the machines to the supply circuit in parallel or in series relation.

5. In a system of regenerative control, the combination with a supply circuit, and a plurality of momentum-driven dynamo-electric machines, of a single electromagnetic means for effecting connection thereof to said supply circuit in parallel relation under relatively high-speed conditions when each machine voltage approximates the supply-circuit voltage and for effecting connection of said machines to said supply circuit in series relation under relatively low-speed conditions when the combined machine voltages approximate the supply-circuit voltage.

6. In a system of regenerative control, the combination with a supply circuit, and a plurality of momentum-driven dynamo-electric machines, of a single relay device for automatically connecting the machines in parallel relation when conditions are suitable for parallel-connected regeneration thereof and for connecting the machines in series relation when conditions are suitable for series-connected regeneration thereof.

7. In a system of regenerative control, the combination with a supply circuit, and a plurality of momentum-driven dynamo-electric machines, of a relay device having a single actuating coil and a single magnetizable member adapted to be actuated thereby, said actuating coil being so connected to the machine circuits that the energization of the coil and the consequent movement of said member automatically effects the grouping of said machines under different conditions in such manner that the voltage of each group approximately equals the supply-circuit voltage.

8. In a system of regenerative control, the combination with a supply circuit, and a plurality of momentum-driven dynamo-electric machines, of a relay device having a single actuating coil and a single set of stationary and movable contact members, said actuating coil being so connected to the machine circuits that the energization of the coil and the consequent engagement of said contact members automatically effects the grouping of said machines under different conditions in such manner that the voltage of each group approximately equals the supply-circuit voltage.

9. In a system of regenerative control, the combination with a supply circuit, and a plurality of momentum-driven dynamo-electric machines, of a relay device adapted to occupy a single operative position and having a single actuating coil, said coil being so connected to the machine circuits that the energization of the coil and the consequent movement of the device to said operative position effects the connection of the machines in parallel or in series relation under different regenerative conditions.

10. In a system of regenerative control, the combination with a supply circuit, and a plurality of momentum-driven dynamo-electric machines, of switching means for connecting the corresponding terminals of the machine armatures under predetermined conditions, and a main-circuit-governing relay device having an actuating coil connected from a point intermediate said switching means and one of the armatures to a point connected to the terminal of the second machine armature that is remote from said switching means.

11. In a system of regenerative control, the combination with a supply circuit, and a plurality of momentum-driven dynamo-electric machines, of switching means employed during parallel operation of the machines for connecting the higher-voltage terminals thereof, switching means for connecting the machine armatures in series relation, a relay device having an actuating coil connected from a point intermediate said parallel switching means and one of the armatures to the lower-voltage terminal of the second machine armature, whereby the relay coil is adapted to receive the voltage of each armature during closure of the parallel-connecting switching means and to receive the combined voltages of the armatures during closure of the series-connecting switching means, and circuits governed by said relay device for connecting the machines in initial parallel or series relation across the supply circuit dependent upon the machine-voltage conditions.

12. In a system of regenerative control, the combination with a supply circuit, and a plurality of momentum-driven dynamo-electric machines, of means for exciting the machine field winding to build up the machine voltages, a supply-circuit-connecting switch, switching means employed during parallel operation of the machines for connecting the higher-voltage terminals thereof, switching means for connecting the lower-voltage terminal of one machine to the higher-voltage terminal of the second machine to connect the machines for series operation, a relay device having an actuating coil connected from a point intermediate said parallel switching means and one of the armatures to the lower-voltage terminal of the second machine armature, and circuits governed by said relay device for closing said supply-circuit-connecting switch with the machines either in parallel or in series relation when the individual or the combined generated voltages thereof approximately equal the supply-circuit voltage.

13. The combination with a plurality of dynamo-electric machines adapted for series-parallel operation, of a plurality of main-circuit multi-section resistors, a plurality of sets of switches for varying the active values of said resistors, means for connecting a first and a second switch from each set intermediate the corresponding machine and the respective terminals of the corresponding resistor, and means for disposing the other switches to permit of the same sequence of operation thereof during both series and parallel operation of the machines.

14. The combination with a plurality of dynamo-electric machines adapted for series-parallel operation, of a plurality of main-circuit multi-section resistors, a plurality of sets of switches for varying the active values of said resistors, means for connecting a first and a second switch from each set intermediate the corresponding machine and the respective terminals of the corresponding resistors, means for initially employing the first and the second switch of each set during series and parallel machine operation, respectively, and means for locating the other switches in such manner as to permit of the same sequence of operation thereof during both series and parallel machine operation.

15. The combination with a plurality of dynamo-electric machines adapted for series-parallel operation, of a plurality of main circuit multi-section resistors, a plurality of sets of switches for varying the active values of said resistors, means for connecting a first and a second switch from each set intermediate the corresponding machine and the respective terminals of the corresponding resistors, means for initially employing the first and the second switch of each set during series and parallel machine operation, respectively, and means for connecting the other switches from different intermediate points of each resistor to a point intermediate the corresponding second switch and resistor terminal, whereby the same sequence of operation of said other switches obtains during both series and parallel machine operation.

In testimony whereof, I have hereunto subscribed my name this 11th day of Mar., 1916.

LAURENCE M. PERKINS.